(12) United States Patent
West et al.

(10) Patent No.: US 8,156,564 B2
(45) Date of Patent: Apr. 10, 2012

(54) DISCOVERING NETWORK SERVICES

(75) Inventors: Julian Wray West, North Hampton, NH (US); Eric J. Martin, Chester, NH (US); Rajesh K. Mishra, Westford, MA (US)

(73) Assignee: Whaleback Systems Corporation, Portsmouth, NH (US)

( * ) Notice: Subject to any disclaimer, the term of this patent is extended or adjusted under 35 U.S.C. 154(b) by 834 days.

(21) Appl. No.: 11/580,701

(22) Filed: Oct. 13, 2006

(65) Prior Publication Data

US 2007/0143449 A1   Jun. 21, 2007

Related U.S. Application Data

(60) Provisional application No. 60/727,130, filed on Oct. 14, 2005, provisional application No. 60/809,062, filed on May 26, 2006.

(51) Int. Cl.
  *H04L 29/06*   (2006.01)
(52) U.S. Cl. .................. 726/27; 726/6; 725/87; 725/91; 725/101; 725/103
(58) Field of Classification Search .................. 380/202; 726/6, 27; 725/87, 91, 101, 103
  See application file for complete search history.

(56) References Cited

U.S. PATENT DOCUMENTS

| | | | |
|---|---|---|---|
| 4,354,062 A | 10/1982 | Mussman et al. | |
| 4,656,366 A | 4/1987 | Davis et al. | |
| 4,763,317 A | 8/1988 | Lehman et al. | |
| 5,796,795 A | 8/1998 | Mussman et al. | |
| 6,104,711 A | 8/2000 | Voit | |
| 6,188,687 B1 | 2/2001 | Mussman et al. | |
| 6,243,388 B1 | 6/2001 | Mussman et al. | |
| 6,282,574 B1 | 8/2001 | Voit | |
| 6,775,697 B1 | 8/2004 | Surazski et al. | |
| 6,958,992 B2 | 10/2005 | Lee et al. | |
| 7,046,659 B1 | 5/2006 | Woundy | |
| 7,075,922 B2 | 7/2006 | Mussman et al. | |
| 7,127,526 B1 | 10/2006 | Duncan et al. | |
| 7,151,966 B1 * | 12/2006 | Baier et al. ....................... | 700/19 |
| 7,215,643 B2 | 5/2007 | Mussman et al. | |
| 7,339,934 B2 | 3/2008 | Mussman et al. | |
| 7,346,043 B1 | 3/2008 | Olshansky | |
| 7,363,381 B2 | 4/2008 | Mussman et al. | |
| 7,379,471 B2 | 5/2008 | Mitsumori et al. | |
| 7,388,946 B1 | 6/2008 | Mussman et al. | |

(Continued)

FOREIGN PATENT DOCUMENTS

WO   WO2007/047639   4/2007

(Continued)

OTHER PUBLICATIONS

Office Action in U.S. Appl. No. 11/580,540, dated Jan. 23, 2009.

(Continued)

*Primary Examiner* — Michael Pyzocha
*Assistant Examiner* — Paul Callahan
(74) *Attorney, Agent, or Firm* — Fish & Richardson P.C.

(57) ABSTRACT

A method includes sending a request for network services to plural devices, where the request identifies the network services using a self-describing data structure, and receiving a response to the request from at least one device, where the response identifies which of the network services are supported by the at least one device.

22 Claims, 7 Drawing Sheets

U.S. PATENT DOCUMENTS

| | | |
|---|---|---|
| 2002/0103720 A1 | 8/2002 | Cline et al. |
| 2002/0131402 A1 | 9/2002 | Lee et al. |
| 2002/0141390 A1 | 10/2002 | Fangman et al. |
| 2002/0159440 A1 | 10/2002 | Mussman et al. |
| 2002/0174117 A1* | 11/2002 | Nykanen .................... 707/4 |
| 2002/0196776 A1 | 12/2002 | Chiang |
| 2003/0093563 A1 | 5/2003 | Young et al. |
| 2003/0156579 A1 | 8/2003 | Cho |
| 2003/0206546 A1 | 11/2003 | Beyda |
| 2004/0125923 A1 | 7/2004 | See et al. |
| 2004/0139209 A1 | 7/2004 | Mussman et al. |
| 2004/0213260 A1 | 10/2004 | Leung et al. |
| 2005/0025043 A1 | 2/2005 | Mussman et al. |
| 2005/0025123 A1 | 2/2005 | Mitsumori |
| 2005/0180403 A1 | 8/2005 | Haddad et al. |
| 2005/0180555 A1 | 8/2005 | Sarp et al. |
| 2005/0189401 A1 | 9/2005 | Butzer et al. |
| 2005/0198188 A1 | 9/2005 | Hickman |
| 2005/0220139 A1* | 10/2005 | Aholainen .................... 370/466 |
| 2006/0274733 A1 | 12/2006 | Mussman et al. |
| 2007/0008893 A1 | 1/2007 | Singh et al. |
| 2007/0070976 A1 | 3/2007 | Mussman et al. |
| 2007/0133567 A1 | 6/2007 | West |
| 2007/0165607 A1 | 7/2007 | Mussman et al. |
| 2007/0283042 A1 | 12/2007 | West |
| 2007/0286361 A1 | 12/2007 | West |
| 2008/0063149 A1 | 3/2008 | West |
| 2008/0070528 A1 | 3/2008 | Joyner et al. |
| 2008/0112327 A1 | 5/2008 | Mussman et al. |

FOREIGN PATENT DOCUMENTS

| | | |
|---|---|---|
| WO | WO2007/047643 | 4/2007 |

OTHER PUBLICATIONS

Int'l Search Report & Written Opinion in Application No. PCT/US2006/40504, dated Sep. 20, 2007.
Int'l Search Report & Written Opinion in Application No. PCT/US2006/40493, dated Feb. 11, 2008.
Int'l Preliminary Report on Patentability in Application No. PCT2006/40504, dated Apr. 16, 2008.
Int'l Preliminary Report on Patentability in Application No. PCT/US2006/040493, dated Apr. 2, 2009.
Action and Response History in U.S. Appl. No. 11/580,540.
Response filed in EP Application No. 06817039.8, dated Jun. 26, 2008.

* cited by examiner

```
<?xml version="1.0" standalone="yes"?>
<servicediscovery type="announcement" status="ready" date="11/21/2005 2:32:27 PM">
    <id org="Whaleback Systems" site="default"/>
    <supportedservices>
        <sip/>
        <mgcp/>
        <ftp/>
        <tftp/>
        <ldap/>
        <smtp/>
        <http/>
        <click2dial address="172.16.1.106" port="5786" hostname="PROXY1"/>
    </supportedservices>
</servicediscovery>
```

FIG. 3

```
<?xml version="1.0" standalone="yes"?>
<servicediscovery type="request" date="11/21/2005 2:32:27 PM">
    <id org="Whaleback Systems" site="default"/>
    <device type="" manufacturer="" model="" version="" serialnumber="" address="172.16.1.28" hostname="pygmy" mac="002a402d9b"/>
    <services>
        <sip versions="2.0"/>
        <mgcp/>
        <click2dial/>
    </services>
    <respondto address="" port="" protocol=udp"/>
</servicediscovery>
```

FIG. 4

```
<?xml version="1.0" standalone="yes"?>
<servicediscovery type="response" status="ready" date="11/21/2005 2:32:27 PM">
    <id org="Whaleback Systems" site="default"/>
    <services>
        <sip proxy="172.16.1.106" port="5060" hostname="PROXY1" realm="WhalebackSystems.com" weight="5"/>
        <sip proxy="172.16.1.211" port="5060" hostname="PROXY2" realm="WhalebackSystems.com" weight="10"/>
        <click2dial address="172.16.1.106" port="5786" hostname="PROXY1"/>
    </services>
</servicediscovery>
```

FIG. 5

```
<services>
    <customservice.acmecorp.com address="172.16.1.106" port="5786" customattr="custom value" ...>
        <element/>
        .
        .
        <elementN/>
    </customservice.acmecorp.com>
</services>
```

FIG. 6

DISCOVERING NETWORK SERVICES

CROSS-REFERENCE TO RELATED APPLICATIONS

This patent application claims priority to U.S. Provisional Application No. 60/727,130, which was filed on Oct. 14, 2005. The contents of U.S. Provisional Application No. 60/727,130 are hereby incorporated by reference into this patent application as if set forth herein in full. This patent application also claims priority to U.S. Provisional Application No. 60/809,062, which was filed on May 26, 2006. The contents of U.S. Provisional Application No. 60/809,062 are hereby incorporated by reference into this patent application as if set forth herein in full.

TECHNICAL FIELD

This patent application relates to discovering services available on a network.

BACKGROUND

VoIP is a protocol that enables users to make telephone calls over a computer network, such as the Internet. VoIP is used to convert a voice signal from a telephone into a digital signal, which can be transmitted over the computer network. At a receiving end, VoIP is used to convert the digital signal back into a voice signal.

VoIP-enabled devices, such as telephones, often require the use of network services, e.g., for communication, configuration, and the like. Existing protocols for discovering network services, however, have limited applicability.

SUMMARY

This patent application describes methods and apparatus, including computer program products, for discovering services available on a network.

In general, this application describes a method that comprises sending a request for network services to plural devices, where the request identifies the network services using a self-describing data structure, and receiving a response to the request from at least one device, where the response identifies which of the network services are supported by the at least one device. The method may include one or more of the following features.

The request may be sent at plural intervals until the response is received. The response may comprise identification data for identifying supported network services, attribute data for identifying attributes associated with the supported network services, and/or weights associated with the supported network services. Each of the weights may specify a relative priority associated with a corresponding supported network service.

The plural devices may comprise a server or other type of computing device. The response may be received from the server. According to the method, an announcement may be received from the server. The announcement may identify the server as ready to receive a request. The request may be sent in response to the announcement.

Plural responses to a single request may be received. Each of the plural responses may come from a different device. Each of the plural responses may identify one or more services available from a corresponding device. The services may be prioritized based, at least in part, on which devices are offering the services.

At least one device may support FTP, TFTP or HTTP/S. The method may comprise obtaining a configuration file from the at least one device using FTP, TFTP or HTTP/S, and using the configuration file to configure hardware for operation on a network. The self-describing data structure may comprise extensible markup language (XML), hypertext transfer protocol (HTTP), type length values, and/or name value pairs.

In general, this application also describes a method performed by a device on a network. The method comprises receiving a request for network services, where the request identifies the network services using a self-describing data structure, and sending a response to the request, where the response identifies which of the network services are supported by the device.

An article of manufacture may store instructions that are executable to perform all or part of each of the foregoing methods and features. The article of manufacture may include one or more machine-readable media that store instructions that are executable by one or more processing devices to implement the methods and/or features.

The details of one or more examples are set forth in the accompanying drawings and the description below. Further features, aspects, and advantages will become apparent from the description, the drawings, and the claims.

DESCRIPTION OF THE DRAWINGS

FIG. 3 includes text for an announcement used in the process of FIG. 2.

FIG. 4 includes text for a request used in the process of FIG. 2.

FIG. 5 includes text for a response used in the process of FIG. 2.

FIG. 6 shows text for an extension to the response of FIG. 5.

Like reference numerals in different figures indicate like elements.

DETAILED DESCRIPTION

Figure 1:
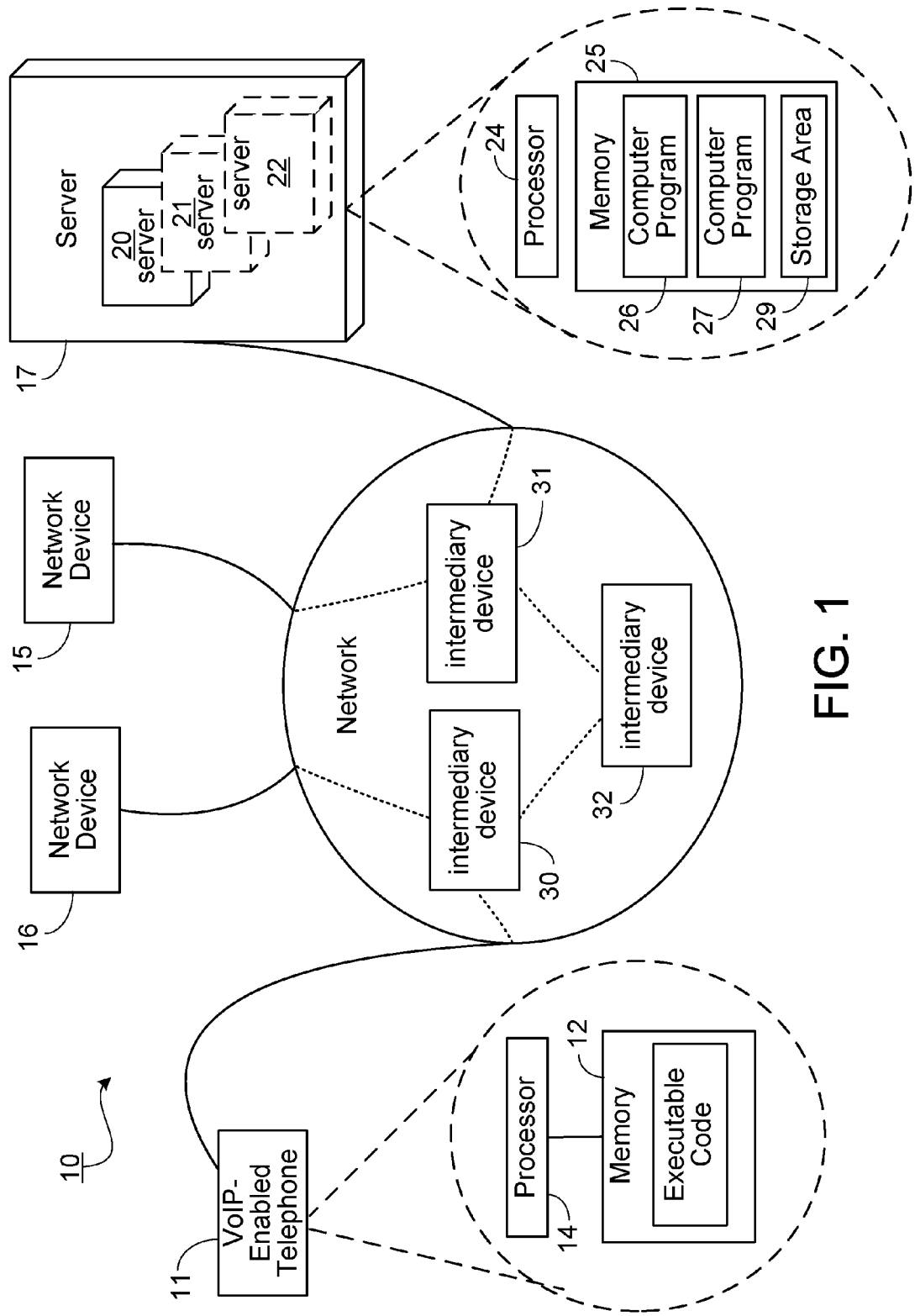
FIG. 1 is a block diagram on which a process for discovering network services may be implemented.

FIG. 1 shows a network 10, over which network devices can communicate. Network 10 may be an IP-enabled network, and may include a local area network (LAN), such as an intranet, and/or a wide area network (WAN), which may, or may not, include the Internet. Network 10 may be wired, wireless, or a combination of the two.

In this example, the network devices include one or more VoIP-enabled devices; however, the processes described herein are not limited to use with VoIP-enabled devices, and may be used with any type of devices that can communicate over a computer network. For example, the processes may be used with desktop or laptop computers, personal digital assistants (PDAs), cellular or standard telephones, video-gaming devices, or the like. In this example, VoIP device 11 is a VoIP-enabled telephone.

VoIP-enabled telephone 11 includes memory 12 and a processing device 14, such as a controller or the like. VoIP-enabled telephone 11 may be programmed with executable code, which may be stored in memory 12. Processing device 14 may execute that code in order to perform at least part of a process described herein.

Network 10 also includes multiple other devices 15 to 17, including servers. Although only three such devices are shown in network 10, any number of devices may be included. These other devices may have any type of architecture and/or programming that enables communication over network 10. One such device, server 17, may include one server 20 or multiple servers 20 to 22 (servers 21 and 22 are depicted using dashed lines to indicate that they are optional).

Each of servers 20 to 22 may have the same, or similar, hardware and/or software configuration. In this implementation, servers 20 to 22 act together to perform various functions described below. In other implementations, a single server may perform all of the server functions. In the case of multiple servers, server 20 may act as a controller or "load balancer" for the remaining servers 21 and 22. In this role, server 20 may route data, requests, and instructions between a client (e.g., a VoIP telephone) and a "slave" server, such as server 22. Server 20 may store information locally, then route data to another server, such as server 21. For the purposes of the following, such internal communications between server 20 and slave servers will be assumed.

Server 20 may be any type of processing server that is capable of receiving and storing data, and of communicating with VoIP clients. As shown in FIG. 1, server 20 includes one or more processor(s) 24 and memory 25 that stores computer programs that are executed by processor(s) 24. In this regard, memory 25 stores a computer program 26 for communicating with clients using, e.g., session initiation protocol (SIP). Memory 25 also contains one or more computer programs 27 for performing at least part of the processes described herein, and one or more storage areas 29 for storing data relating to the various VoIP servers on network 10. FIG. 1 shows these storage areas as internal to server 20; however, they may be external or a combination of internal and external.

Network 10 may also include one or more intermediary devices 30 to 32. These intermediary devices may include routers, switches, gateways, or the like, which contain tables or other information used to route data packets on network 10 between a source (e.g., VoIP-enabled telephone 11 or server 17) and a destination (e.g., VoIP-enabled telephone 11 or server 17). Each intermediary device may have the same, or different, architecture, and may be programmable to operate in a specified manner.

Figure 2:
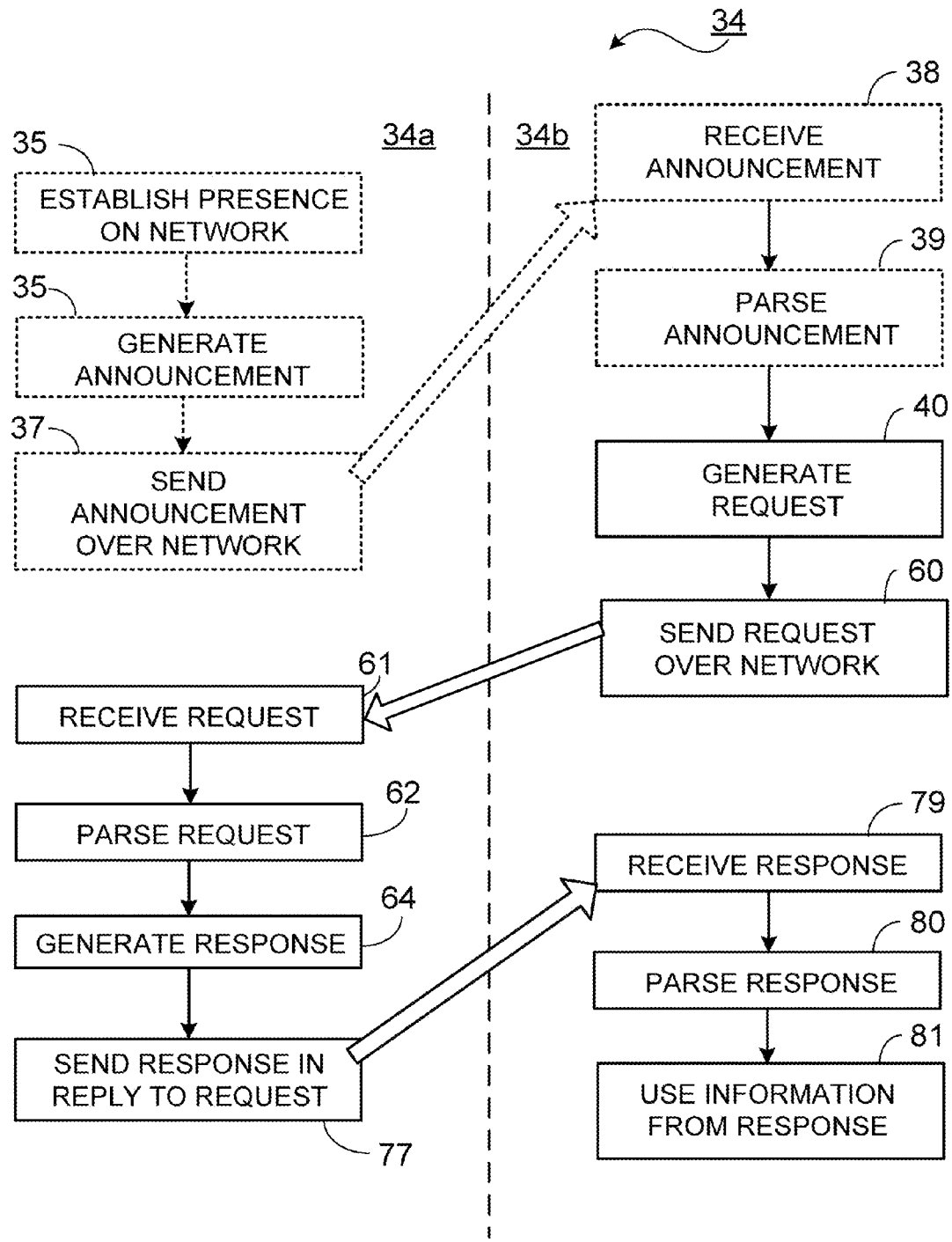
FIG. 2 is a flowchart showing a process for discovering network services.

FIG. 2 shows a process 34 by which VoIP-enabled telephone 11 discovers services available on network 10, for example, on server 17. In this regard, process 34 will be described, for the most part, in the context of a VoIP-enabled telephone discovering services available from one or more servers. It is noted, however, that process 34 may be used by any one device to discover services available from any other device, and that such devices may be of the same type or of different types.

In FIG. 2, process 34 is split into a left part 34a, which is performed by one or more servers, and a right part 34b, which is performed by VoIP-enabled telephone 11. It is noted, however, that the actions shown in FIG. 2 may be assigned differently. For example, in other implementations, actions performed by a server may be performed by the VoIP-enabled telephone, and vice versa.

Furthermore, in FIG. 2, the blocks shown in dashed lines are optional. That is, rather than starting at block 35, process 34 may start at block 40. Actions associated with the optional blocks are explained as follows, followed by the remainder of process 34.

In process 34, a device, such as server 17, establishes (35) a presence on network 10. For example, server 17 may be installed for the first time on network 10, or server 17 may power-up from a powered-down state. In any case, once server 17 establishes its presence on network 10, server 17 generates (36) an announcement. In this context, an announcement is a message that identifies the status of server 17 and, in some cases, the services available from server 17. Examples of server status include, but are not limited to, "ready", which indicates that server 17 is running and available for communications, and "shutdown", which indicates that the server is unavailable. Other status indications may also be used. Examples of services that may be available from server 17 include, but are not limited to, SIP (session initiation protocol), MGCP (media gateway control protocol), FTP (file transfer protocol), TFTP (trivial file transfer protocol), LDAP (lightweight directory access protocol), SMTP (simple mail transfer protocol), HTTP (hypertext transfer protocol), and proprietary protocols/services, such as Click2Dial. Click2Dial is a service that may be used with computer-integrated VoIP telephones. In Click2Dial, a Web browser or other application on the computer may display a list of telephone numbers, and a user may click on a selected telephone number. In response, the computer controls the VoIP telephone to call the selected number.

In this example, the announcement is implemented using a self-describing data structure, such as XML (extensible markup language). Use of a self-describing data structure is advantageous because it enables the announcement to describe any type of service that may be supported by a server and/or client (e.g., a VoIP-enabled telephone). In other words, the announcement is extendable to support any type of service. Other examples of self-describing data structures include, but are not limited to, HTTP, type length values (TLV), and name value pairs. It is noted that process 34 is not limited to use with announcements that are implemented using self-describing data structures. Announcements that do not use self-describing data structures may also be used.

An example of an announcement 41 implemented using XML is shown in FIG. 3. As shown in FIG. 3, announcement 41 includes services 42, status 44, and other information, such as the current date 45 and the XML version 46. Announcement 41 may also include information, such as the version of the services available (not shown). Basically, announcement 41 can include any information to be communicated to clients.

Referring back to FIG. 2, server 17 sends (37) announcement over network 10. In this implementation, server 17 multicasts announcement 41; however, server 17 may also broadcast or unicast announcement 41. Routers on network 10 may be configured to pass a range of IP addresses associated with the multicast.

VoIP-enabled telephone 11, along with other devices on network 10 in the multicast group, receives (38) the (multicast) announcement from server 17. VoIP-enabled telephone 11 may use the announcement to identify that status of, and services available from, server 17. For example, VoIP-enabled telephone 11 may parse (39) the XML in the announcement and thereby obtain the services available from server 17. Alternatively, VoIP-enabled telephone 11 may simply take the announcement as an indication that server 17 is up and ready on network 10, or down on network 10, as the case may be.

VoIP-enabled telephone 11 may generate (40) a request for services. The request may be generated in response to an announcement from server 17 or it may be generated periodically, e.g., every one minute, ten minutes, etc. irrespective of whether an announcement is received from a server. For example, if the announcement indicates that a server is going down, and VoIP-enabled telephone 11 is using services from that server, the announcement may trigger VoIP-enabled telephone 11 to generate a request. The request identifies the device, in this example, VoIP-enabled telephone 1, along with services that VoIP-enabled telephone 11 would like to access from a server. Any of the foregoing services may be requested, along with any other services that may be needed.

In this example, as for the announcement, the request is implemented using a self-describing data structure, such as XML, HTTP, type length values (TLV), and/or name value pairs. As noted above, use of a self-describing data structure is advantageous because it enables the request to describe any type of service that may be supported by a server and/or client (e.g., VoIP telephone). It is noted that process 34 is not limited to use with requests that are implemented using self-describing data structures. Requests that do not use self-describing data structures may also be used.

An example of a request 47 implemented using XML is shown in FIG. 4. As shown in FIG. 4, request 47 includes information 49 identifying VoIP-enabled telephone 11, such as its manufacturer, model, version, serial number, IP address, hostname, and MAC address. Other identifying information may be included in the request. Likewise, at least part of this identification may be omitted.

In this example, request 47 also identifies the organization 50 that owns VoIP-enabled telephone 11, the type 51 of the message (i.e., a request), the date 52 of the request, and the version 54 of XML used to encode the request. The request also contains fields 55 identifying the services that are requested by VoIP-enabled telephone 11. Fields 55 may contain additional information further describing the requested service, such as its version 53, type and/or any other indicia that distinguishes the requested service from like or differing services. The request may also contain an address 56 (none provided in FIG. 4) to which a response should be directed, a port 57 (none provided in FIG. 4) to which the response should be directed, and a protocol 59 for the transmitting response.

Referring back to FIG. 2, VoIP-enabled telephone 11 sends (60) the request over network 10. In this example, VoIP-enabled telephone 11 multicasts the request to servers and/or other devices (e.g., printers, copiers, computers, telephones, etc.) that are known by VoIP-enabled telephone 11 to support the request/response protocol set forth in FIG. 2. In other implementations, VoIP-enabled telephone 11 may broadcast the request over network 10 or unicast the request over network 10.

In this example, a group of devices on network 10, including server 17, receives (61) the request from VoIP-enabled telephone 11. Each device parses (62) the request to identify the device that issued the request and the services requested, among other things. Each device may generate (64) a response to the request. The response identifies which of the requested services that the responding device supports, among other things. In this regard, if a device does not support any of the requested services, that device may not generate a response or may generate a response with empty services fields (which signifies that none of the request services are supported).

In this example, the response also includes information identifying the status of the device. As above, examples of device status include "ready", which indicates that the device is running and available for communications, and "shutdown", which indicates that the device is unavailable. Other status types may also be used. The response may also include the current time/date, and identify the device that is responding along with services that are available from that device. In this regard, multiple devices may respond to a request from a single VoIP-enabled telephone 11. As described below, the telephone may decide to use services from different servers and/or to prioritize such services.

Like the announcement and request, the response may be implemented using a self-describing data structure, such as XML, HTTP, type length values (TLV), and name value pairs. As noted above, use of a self-describing data structure is advantageous because it enables the response to describe any type of service that may be supported by a server (or other device) and/or client (e.g., VoIP telephone). It is noted that process 34 is not limited to use with responses that are implemented using self-describing data structures. Responses that do not use self-describing data structures may also be used.

An example of a response 66 implemented using XML is shown in FIG. 5. Response 66 was generated by server 17. Response 66 includes information 67 identifying the version of XML used, information 69 identifying the type of message (i.e., a response), information 70 identifying the status of the responding server, the date 71, and information 72 identifying the organization owning the responding sever. Response 66 also includes information 74 identifying services available from the responding server. Information 74 may include elements identifying, e.g., an address of a service, its port, a hostname of the server, and a realm in which the server is located. The elements may also include a weight 75. The weight specifies a relative priority associated with a corresponding supported network service. For example, a lower weight may indicate that the corresponding supported network service is preferred for some reason over a network service with a higher weight, or vice versa.

The response may also include elements 76 (FIG. 6), which may specify capabilities associated with a responding device or service. For example, if the responding device is a printer, elements may specify, e.g., page sizes, colors, fonts, etc. supported by the printer. The elements may also specify, e.g., availability of a service or device, such as days or time periods during which the service or device is available.

Each device (e.g., server 17) that generates a response sends (77) the response to the requesting device, in this case, VoIP-enabled telephone 11. VoIP-enabled telephone 11 receives (79) one or more such responses from one or more corresponding devices on network 10, parses (80) the responses to identify services available over the network, and uses (81) the services as appropriate. VoIP-enabled telephone 11 may create a list of available services, along with priorities associated with each service. For example, if one responding device has a SIP service available with a weight of ten and another responding device has a SIP service available with a weight of five, VoIP-enabled telephone 11 may designate the SIP service with a weight of five as usable first and the SIP service with a weight of ten as usable second (e.g., if the SIP service with a weight of five becomes unavailable). In another example, each response may identify a network subnet of a responding device. VoIP-enabled telephone 11 may designate a responding device on the same subnet as a higher priority device than a responding device on a remote subnet.

In one implementation, VoIP-enabled telephone 11 may use the request/response protocol defined by process 34 as part of a configuration process. The following describes such an implementation performed on the network of FIG. 7.

Figure 7:
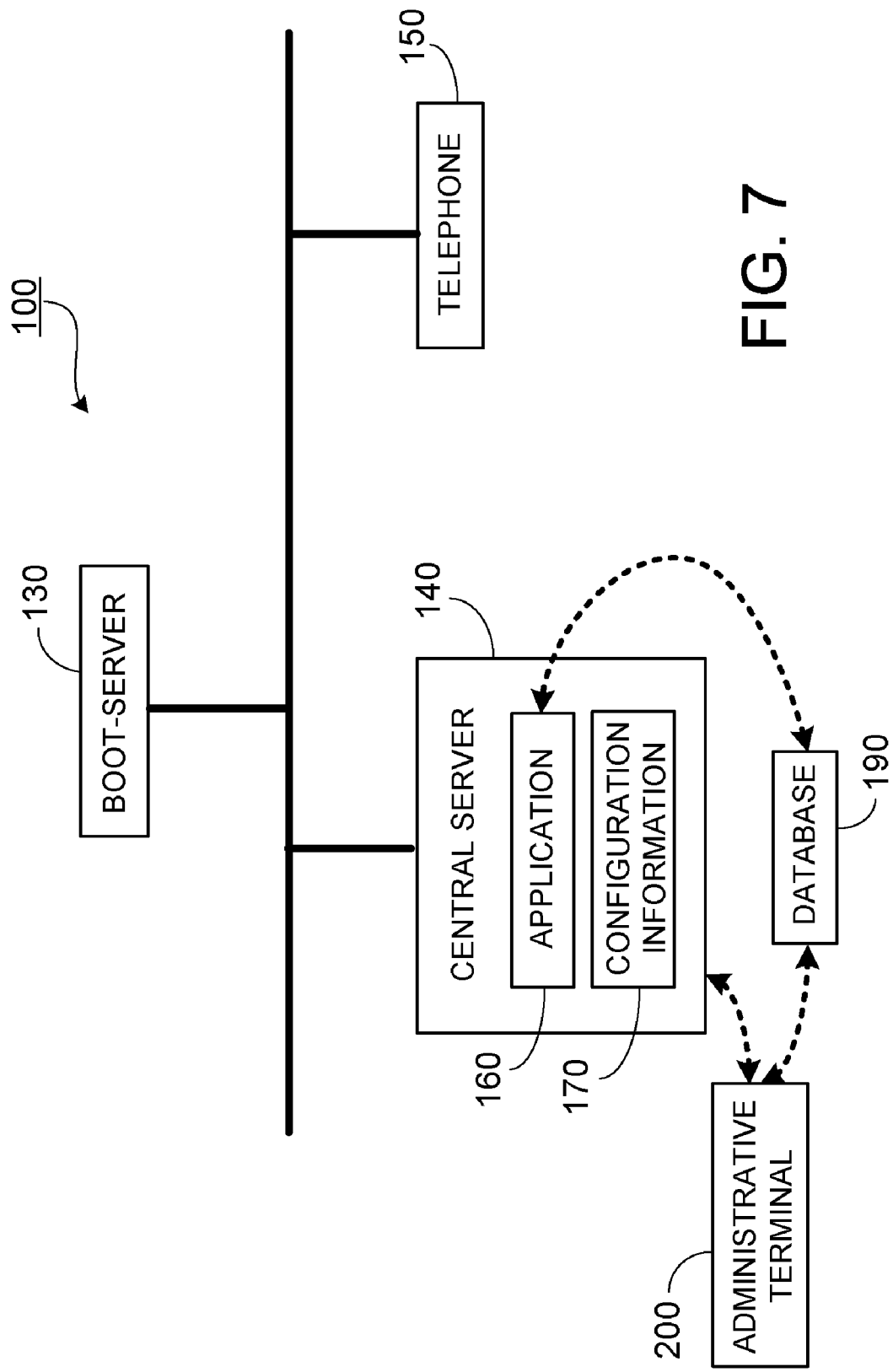
FIG. 7 is a block diagram of a network on which a process for configuring network devices, which includes the process of FIG. 2, may be implemented.

FIG. 7 shows a network 100, over which VoIP-enabled devices communicate. Network 100 may be an IP-enabled network, and may include a local area network (LAN), such as an intranet, and/or a wide area network (WAN), which may, or may not, include the Internet. Network 100 may be wired, wireless, or a combination of the two.

Network 100 includes servers 130 and 140, each of which implements a network node that may include a single computer or multiple computers (e.g., a server farm). In this implementation, each of the servers is assigned a different function, as described below. In other implementations, a single server can perform more than one such function or, alternatively, a single server may perform all of the functions.

Network 100 also includes one or more VoIP devices. At least one VoIP device may be a VoIP-enabled telephone 150. Described below is a process for configuring telephone 150. First, however, elements of network 100 are described.

Server 130, referred to herein as the boot-server, runs FTP. Briefly, FTP is a protocol for transferring files over an IP network, which operates in a manner similar to HTTP for transferring Web pages and SMTP for transferring electronic mail. Other implementations may use other protocols, such as TFTP and HTTP/S (secure HTTP).

Telephone 150 uses process 34 to identify whether a configuration file can be obtained from boot-server 130, as described in more detail below. If boot-server 130 has a specific configuration file for telephone 150, boot-server 130 provides that configuration file to telephone 150 over network 100. Otherwise, boot-server 130 provides a default configuration file. The default configuration file is used in generating a mac.cfg file for telephone 150, as described in more detail below.

A central server 140 controls configuration of telephone 150. In this regard, central server 140 implements a telephone activation service for use in configuring VoIP telephones (or other devices) on network 100. The telephone activation service may be implemented via an application 160 that is run on central server 140. Application 160 is configured to identify the MAC address of telephone 150 based on communications from telephone 150. For example, application 160 may use reverse address resolution protocol (RARP) to identify the MAC address of telephone 150 using an IP address of the telephone. The IP address of telephone 150 may be included in one or more data packets that are part of the communications from telephone 150 to central server 140.

Application 160 uses the MAC address of telephone 150 and configuration information 170 to generate a mac.cfg file for telephone 150. Application 160 may obtain the configuration information from central server 140, from an associated database 190, and/or from existing operating system, e.g., Windows®, files associated with a user of telephone 150. The configuration information may contain any type of information, such as the telephone number and/or internal extension of telephone 150, the identity of a user of telephone 150, ring-tones or other information relating to telephone rings, network data, global configuration data, and the like. The configuration information can include any information relating to operation of telephone 150 and its operation on network 100.

Database 190 may be populated with configuration information, e.g., via an administrative terminal 200. Administrative terminal 200 may be one or more computer terminals through which a network administrator may enter some, or all, of the configuration information (e.g., configuration parameters) for telephone 150. The configuration parameters may be entered via a Web interface, for example, or through any other computer data entry system. Configuration information that is used for all VoIP telephones on network 100 may be input once and stored for later use.

Figure 8A:
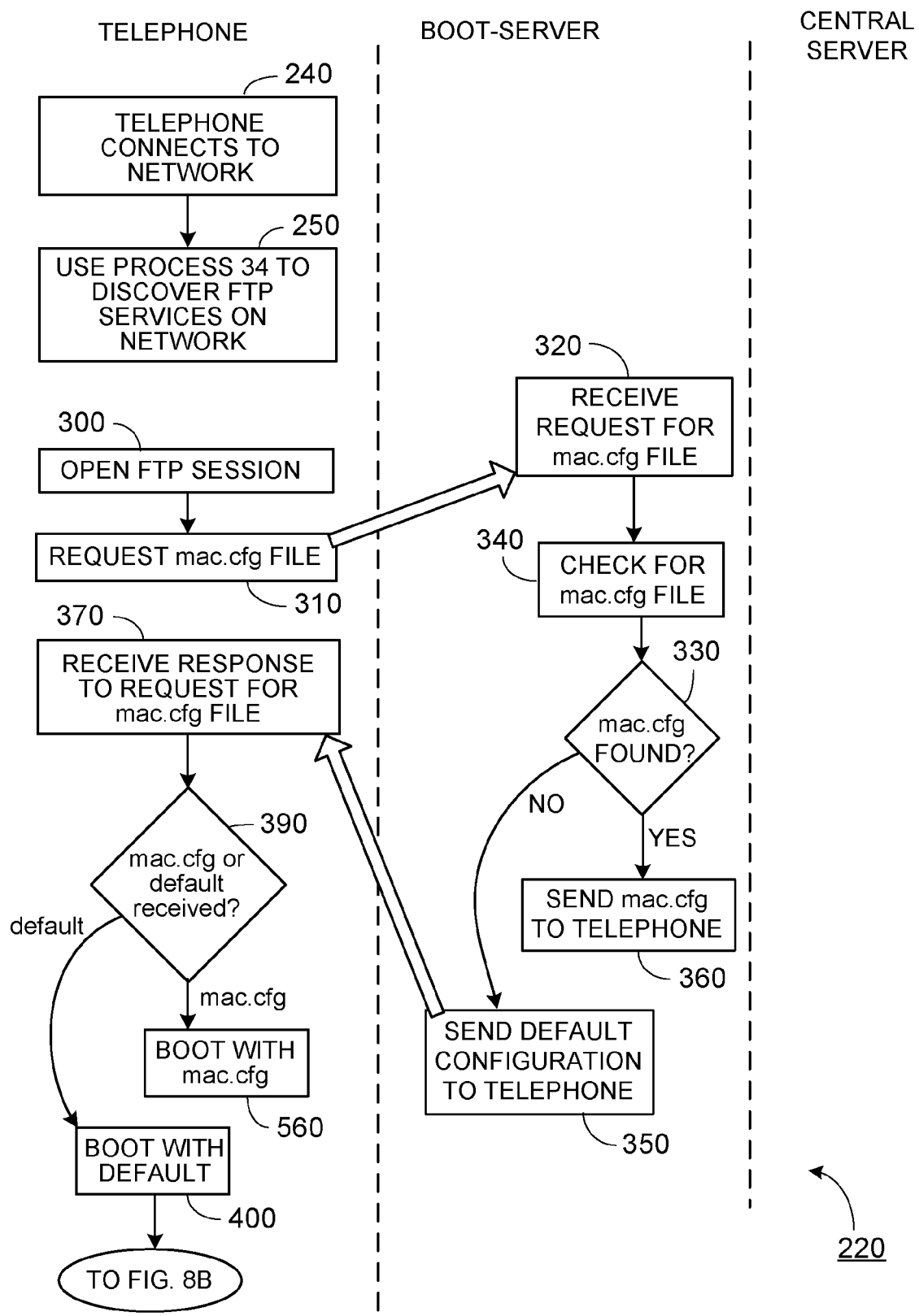
FIG. 8, comprised of FIGS. 8a and 8b, is a process for configuring a device on the network of FIG. 7, which uses the process of FIG. 2.
Figure 8B:
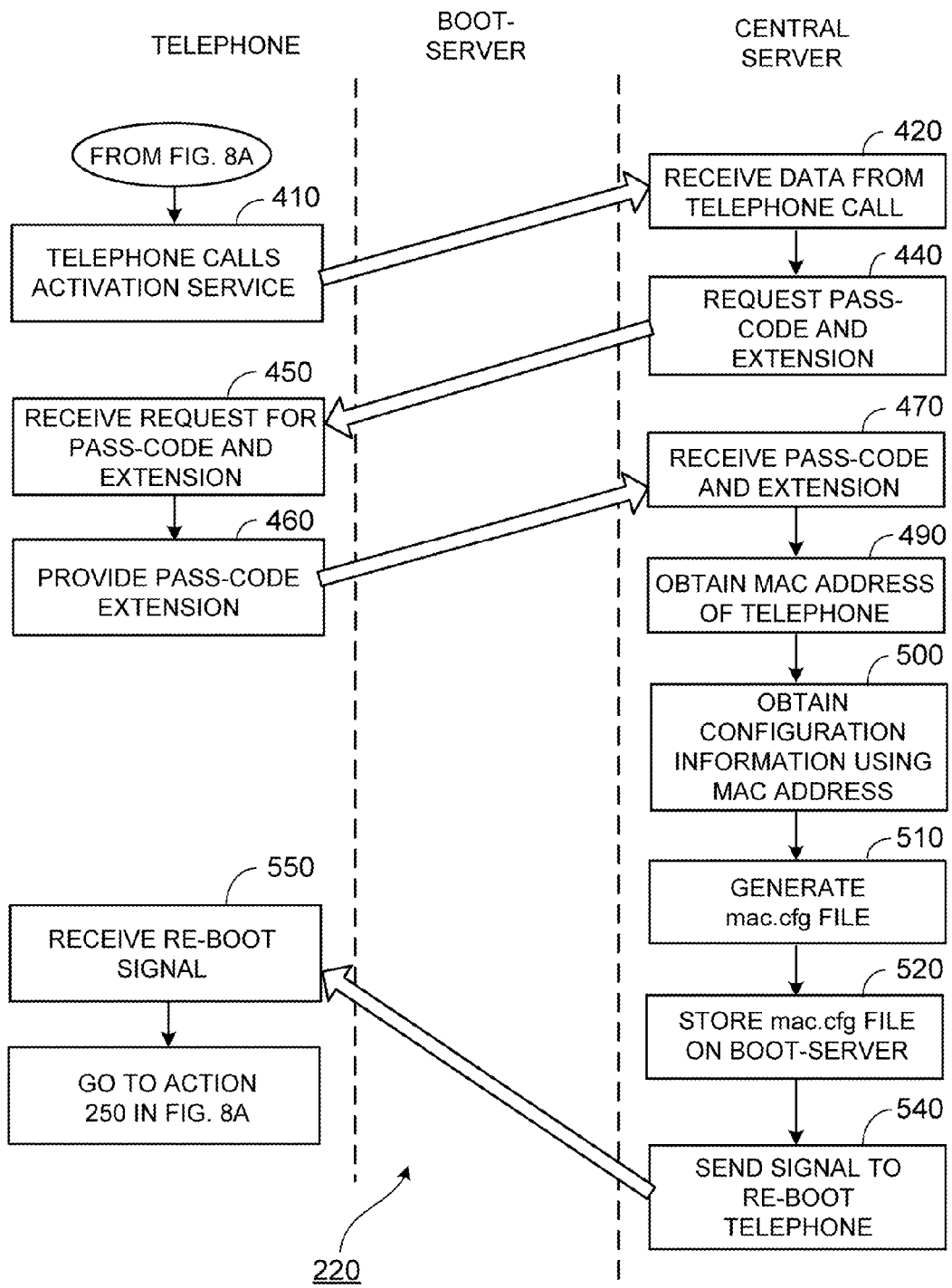

FIG. 8 shows a process 220 for configuring telephone 150 using application 160. In this implementation, as depicted in FIG. 8, the actions listed under "telephone" are performed by telephone 150; the actions listed under "boot-server" are performed by boot-server 130; and the actions listed under "central server" are performed by central server 140.

In process 220, telephone 150 connects (240) to network 100. That is, telephone 150 may be connected physically, e.g., via Ethernet, to network 100. Following connection, telephone 150 may obtain, e.g., from a DHCP (dynamic host control protocol) server (not shown), an IP address. Telephone 150 also uses (250) process 34 (FIG. 2) in obtaining a specific configuration file, or a default configuration file, from boot-server 130. That is, process 34 is used to discover that boot-server 130 provides FTP services on network 100, which may be used to obtain a configuration file.

More specifically, referring to FIG. 2, telephone 150 uses process 34 to identify FTP services available on network 100. Telephone 150 generates (40) a requests for services available from devices on the network, and sends (60) that request to devices on the network, including boot-server 130. Among the requested services is FTP. The request may have the format of request 47 in FIG. 4. Boot-server 130 receives (61) the request, parses (62) the request to identify the requested services, generates (64) a response to the request, and sends (77) the response to telephone 150. The response may have the format of response 66 in FIG. 5, and indicates that boot-server 130 supports FTP. Telephone 150 receives (79) the response from boot-server 130, parses (80) the response to identify services available from boot-server 130, and uses (81) those services. Here, the service of interest is FTP. In this implementation, telephone 150 opens (300) an FTP session with boot-server 130 using, e.g., its address obtained from the response. During the FTP session, telephone 150 requests a configuration file from boot-server 130. As explained below, the configuration file is requested on the basis of the media access control (MAC) address of telephone 150 and, hence, is called "mac.cfg". Alternatively, the configuration file may be requested on the basis of another telephone identifier or parameter.

Thus, as explained above, telephone 150 requests (310) its mac.cfg file from boot-server 130. Boot server receives (320) the request from telephone 150 and checks (340) its (internal or external) memory for the mac.cfg file for telephone 150. Boot-server 130 may check for the mac.cfg file using the MAC or IP address of telephone 150, which may be obtained from communications with telephone 150. That is, the mac.cfg file may be stored in association with, and therefore may be retrieved using, the telephone's MAC or IP address.

If boot-server 130 does not contain, or otherwise have access to, the mac.cfg file for telephone 150, boot-server 130 sends (350) telephone 150 a default configuration file (in this example, called a 000000000000.cfg file). The default configuration file contains instructions that enable telephone 150 to contact the telephone activation service, which may be running, e.g., on central server 140. The following text describes the case in which boot-server 130 sends the default configuration file. The case in which boot-server 130 sends (360) the mac.cfg file for telephone 150 is described below.

Telephone 150 receives (370) a response to its request for a configuration file. If the response contains (390) the default configuration file (as is assumed in this example), telephone 150 boots (400) using the default configuration file. In this example, the default configuration file contains a telephone number of the activation service on central server 140 (here, extension "ACTIVATE", although any alphanumeric string may be used). In other implementations, the default configuration file may use ways of communicating to the activation service other than dialing the service. Telephone 150 goes off-hook and calls (410) the activation service (which, in this example, is run by application 160 on central server 140). Telephone 150 automatically dials the activation service when it goes off-hook; it is not capable of calling any other numbers in this implementation. Application 160 receives (420) the telephone call from telephone 150 and requests (440), from telephone 150, a pass-code and an extension. This request may be made via an interactive voice application or via any other means. Validation information other than a pass-code and extension may be requested and received.

Telephone 150 receives (450) the request and provides (460) the pass-code and extension to application 160. The pass-code and extension may be input to the telephone by its user. Application 160 receives (470) the pass-code and extension, and validates the pass-code. The extension also may require validation, e.g., to confirm that it is unique on network 100. In this implementation, only authorized telephones, as determined by their passcodes and/or extension, will operate on network 100.

In other implementations, the request/response may include audio prompt(s) and a dial pad digit response, text prompt(s) and a digit response, screen display prompt(s) and a keyboard input, electronic query and responses of any sort, such as via a smart card, USB (Universal Serial Bus) dongle, RFID (Radio Frequency IDentifier), or any other means. Any combination of these, or other, actions may also be used. Automatic speech recognition (ASR), text-to-speech (TTS), and prerecorded prompts can be used together in an interactive application to enable simple configuration/activation/etc. over the network using an individual's voice instead of (or in addition to) DTMF (Dual Tone Multi-Frequency).

Communications, such as data packets, sent from telephone 150 to application 160 contain the IP address of telephone 150. In this example, application 160 uses RARP to obtain (490) the MAC address of telephone 150 using its IP address. Other ways of obtaining the MAC address may also be used. Application 160 obtains (500) device-specific configuration information for telephone 150 using the MAC address. Application 160 may obtain the configuration information, e.g., from database 190, from configuration file(s) on central server 140, and/or from operating system, e.g., Windows®, files relating to a user of telephone 150 that are accessible to application 160 via network 100.

Application 160 obtains the configuration information for telephone 150, as noted above, and generates (510) a mac.cfg configuration file that is specific for telephone 150, i.e., a device-specific configuration file. The mac.cfg file contains configuration information, such as a telephone number, that distinguishes telephone 150 from other like VoIP-enabled devices on network 100. The mac.cfg file may also contain session initiation protocol (SIP) information that is global for network 100.

In this implementation, application 160 stores (520) the mac.cfg file on boot-server 130 in association with, e.g., the MAC (or IP) address of telephone 150. Application 160 also sends (540) telephone 150 a signal instructing telephone 150 to re-boot. Re-booting is performed using the newly-generated mac.cfg file. Telephone 150 receives (550) the re-boot signal from application 160. In response, telephone 150 re-boots.

At re-boot, telephone 150, requests an IP address and opens (300) an FTP session with boot-server 130. Thereafter, process 220 proceeds in the manner explained above until point 330. At that point, boot-server 130 sends (360) the mac.cfg file to telephone 150 instead of the default configuration file. Telephone 150 receives (370) the mac.cfg file and boots (560) using the mac.cfg file. Telephone 150 uses configuration information in the mac.cfg file to configure itself for VoIP operations via network 100.

Process 220 is repeated each time telephone 150 re-boots. So, if telephone 150 is to be reconfigured, application 160 need simply update the mac.cfg file for telephone 150. Thereafter, when telephone 150 re-boots, any new information in the mac.cfg file is used to reconfigure telephone 150 for VoIP operation on network 100. The same is true for other telephones or VoIP-enabled devices on network 100. For example, if the same extension is to ring on two telephones, the mac.cfg files for each of those telephones may be updated, and the telephones may be re-booted to effect the new configuration.

It is noted that the processes described herein are not limited to use with a telephone obtaining configuration information upon re-booting. The telephones may use any process, described herein or otherwise, to obtain configuration information.

In other implementations, telephone 150 may use process 34 of FIG. 2 to identify the activation service operating on central server 140, thereby eliminating the need to obtain the default configuration file described above.

All or part of the processes described herein and their various modifications (hereinafter referred to as "the processes") can be implemented, at least in part, via a computer program product, i.e., a computer program tangibly embodied in one or more information carriers, e.g., in one or more machine-readable storage media or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The processes are not limited to use with VoIP-enabled telephones or to any particular hardware or hardware manufacturer. Rather, the processes can be implemented with any networked device, which may or may not run VoIP. Likewise, the processes are not limited to the specific hardware and protocols described herein.

Elements of different implementations described herein may be combined to form other implementations not specifically set forth above. Other implementations not specifically described herein are also within the scope of the following claims.

What is claimed is:

1. A method performed by a network device, comprising:
    multicasting a request for network services to plural devices that support network services, the request identifying the network services using a self-describing data structure;
    receiving a response to the request from more than one device, each response received from a device identifying which of the network services are supported by the device, each response comprising weights associated with supported network services, each of the weights corresponding to a priority associated with a supported network service; and
    using the weights to prioritize the network services for potential use by the network device.

2. The method of claim 1, further comprising:
    sending the request at plural intervals until a response is received.

3. The method of claim 1, wherein each response comprises one or more of the following: identification data for identifying supported network services, and attribute data for identifying attributes associated with the supported network services.

4. The method of claim 1, wherein each response comprises identification data for identifying supported network services, and attribute data for identifying attributes associated with the supported network services.

5. The method of claim 1, wherein the plural devices comprise a server and a response is received from the server; and
    wherein the method further comprises receiving an announcement from the server, the announcement identifying the server as ready to receive a request.

6. The method of claim 5, wherein the request is sent in response to the announcement.

7. The method of claim 1, wherein at least one device among the plural devices to which the request is multicast supports FTP, TFTP or HTTP/S; and
    wherein the method further comprises:
        obtaining a configuration file from the at least one device using FTP, TFTP or HTTP/S; and
        using the configuration file to configure hardware of the network device for operation on a network.

8. The method of claim 1, further comprising:
    prioritizing the network services based, at least in part, on which devices are supporting the services.

9. The method of claim 1, wherein the self-describing data structure comprises extensible markup language (XML).

10. The method of claim 1, wherein the self-describing data structure comprises at least one of hypertext transfer protocol (HTTP), type length values, and name value pairs.

11. A method performed by a device on a network, comprising:
    receiving a request for network services that was multicast on the network to devices that support network services, the request identifying the network services using a self-describing data structure; and
    sending a response to the request, the response identifying which of the network services are supported by the device, the response comprising weights associated with supported network services, each of the weights corresponding to a priority associated with a supported network service, the weights also being relative to priorities of network services supported by devices on the network other than the device performing the method.

12. One or more machine-readable storage media storing instructions that are executable, the one or more machine-readable storage media being non-transitory, the instructions for causing one or more processing devices of a network device to:
    multicast a request for network services to plural devices that support network services, the request identifying the network services using a self-describing data structure;
    receive a response to the request from more than one device, each response from a device identifying which of the network services are supported by the device, each response comprising weights associated with supported network services, each of the weights corresponding to a priority associated with a supported network service; and
    use the weights to prioritize the network services for potential use by the network device.

13. The one or more machine-readable storage media of claim 12, further comprising instructions for causing one or more processing devices to:
    send the request at plural intervals until the response is received.

14. The one or more machine-readable storage media of claim 12, wherein the response comprises one or more of the following: identification data for identifying supported network services, and attribute data for identifying attributes associated with the supported network services.

15. The one or more machine-readable storage media of claim 12, wherein the response comprises identification data for identifying supported network services, and attribute data for identifying attributes associated with the supported network services.

16. The one or more machine-readable storage media of claim 12, wherein the plural devices comprise a server and a response is received from the server; and
    wherein the one or more machine-readable media further comprises instructions for causing one or more processing devices to receive an announcement from the server, the announcement identifying the server as ready to receive a request.

17. The one or more machine-readable storage media of claim 16, wherein the request is sent in response to the announcement.

18. The one or more machine-readable storage media of claim 12, wherein at least one device among the plural devices to which the request is multicast supports FTP, TFTP or HTTP/S; and
    wherein the one or more machine-readable media further comprises instructions for causing one or more processing devices to:
        obtain a configuration file from the at least one device using FTP, TFTP or HTTP/S; and
        use the configuration file to configure hardware for operation on a network.

19. The one or more machine-readable storage media of claim 12, further comprising instructions for causing one or more processing devices to:

prioritize the services based, at least in part, on which devices are supporting the services.

20. The one or more machine-readable storage media of claim 12, wherein the self-describing data structure comprises extensible markup language (XML).

21. The one or more machine-readable storage media of claim 12, wherein the self-describing data structure comprises at least one of hypertext transfer protocol (HTTP), type length values, and name value pairs.

22. One or more machine-readable storage media storing instructions that are executable, the one or more machine-readable storage media being non-transitory, the instructions for causing one or more processing devices to:

receive a request for network services that was multicast on the network to devices that support network services, the request identifying the network services using a self-describing data structure; and send a response to the request, the response identifying which of the network services are supported by the device, the response comprising weights associated with supported network services, each of the weights corresponding to a priority associated with a supported network service, the weights also being relative to priorities of network services supported by other devices on the network.

* * * * *